United States Patent [19]
Kyrtsos

[11] Patent Number: 5,343,994
[45] Date of Patent: Sep. 6, 1994

[54] END OF FILL DETECTOR FOR A HYDRAULIC CLUTCH

[75] Inventor: Christos T. Kyrtsos, Peoria, Ill.

[73] Assignee: Caterpillar Inc., Peoria, Ill.

[21] Appl. No.: 35,779

[22] Filed: Mar. 23, 1993

[51] Int. Cl.$^5$ .................... F16D 25/14; F15B 13/00
[52] U.S. Cl. .................. 192/85 R; 192/109 F;
 137/625.64; 91/361; 361/159
[58] Field of Search .......... 192/85 R, 109 F;
 91/361; 137/625.64; 361/154, 159, 186

[56] References Cited

U.S. PATENT DOCUMENTS

| | | | |
|---|---|---|---|
| 3,295,421 | 1/1967 | McCormick | 361/154 X |
| 4,135,610 | 1/1979 | Chatterjea | 192/109 F X |
| 4,707,789 | 11/1987 | Downs et al. | 364/424.1 |
| 4,785,849 | 11/1988 | Masuda | 137/625.64 |
| 4,855,911 | 8/1989 | Brekkestran et al. | 364/424.1 |
| 4,871,048 | 10/1989 | Chatterjea | 192/3.58 |
| 4,936,167 | 6/1990 | Mehta | 74/866 |
| 4,942,787 | 7/1990 | Aoki et al. | 192/109 F X |
| 4,949,264 | 8/1990 | Katayama et al. | 192/109 F X |
| 5,054,599 | 10/1991 | Marcott | 192/85 R |

FOREIGN PATENT DOCUMENTS

| | | |
|---|---|---|
| 61-157418 | 1/1988 | Japan . |
| 63-105649 | 4/1988 | Japan . |
| 88/07636 | 6/1988 | PCT Int'l Appl. . |

OTHER PUBLICATIONS

Komatsu Technical Guide, "K-Atomics Komatsu-Advanced Transmission with Optimum Modulation Control," 1989.
Article entitled "The Fast Wavelet Transform: Beyond Fourier Transforms" from Dr. Dobb's Journal dated Apr. 1922 vol. 17 No. 4 p. 16(9) by Mac A. Cody.

*Primary Examiner*—Leslie A. Braun
*Assistant Examiner*—Andrea Pitts
*Attorney, Agent, or Firm*—James R. Yee

[57] ABSTRACT

An apparatus and method are adapted for detecting an end-of-fill condition of an actuator having a varying control volume is provided. The end-of-fill condition corresponds to the varying control volume being pressurized to a predetermined end-of-fill pressure. The apparatus comprises a solenoid having a coil and an armature. The armature is movable relative to the coil in response to energization of the coil. A valve delivers a flow of fluid to the actuator. The fluid flow having a rate responsive to the movement of the armature. The apparatus and method controllably energizes the coil with a control current. The apparatus and method detects a flyback current in the coil, detects a change in the level of noise in said flyback current, and responsively producing an end-of-fill signal in response to the change being greater than a predetermined threshold.

16 Claims, 4 Drawing Sheets

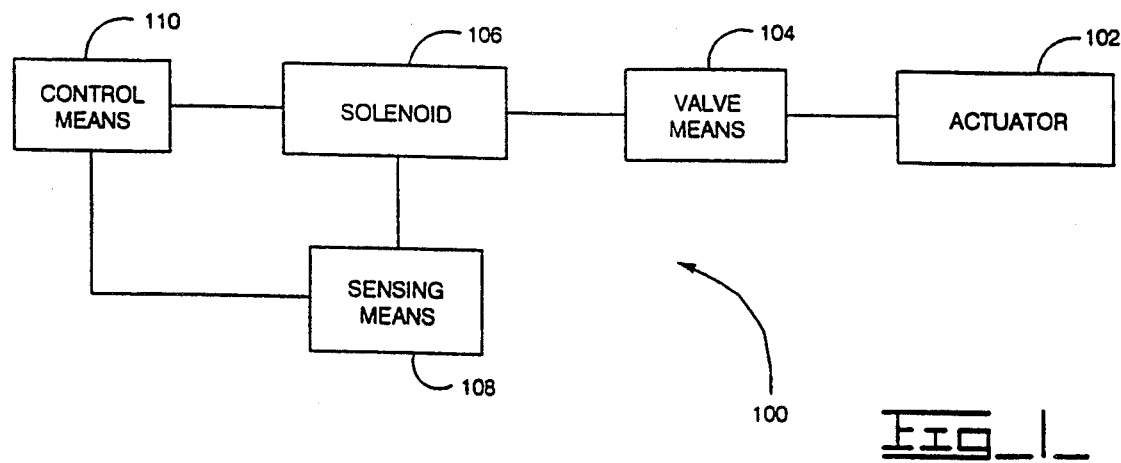
Fig_1_
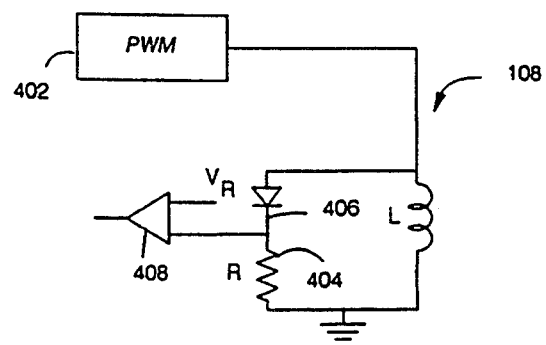
Fig_4_

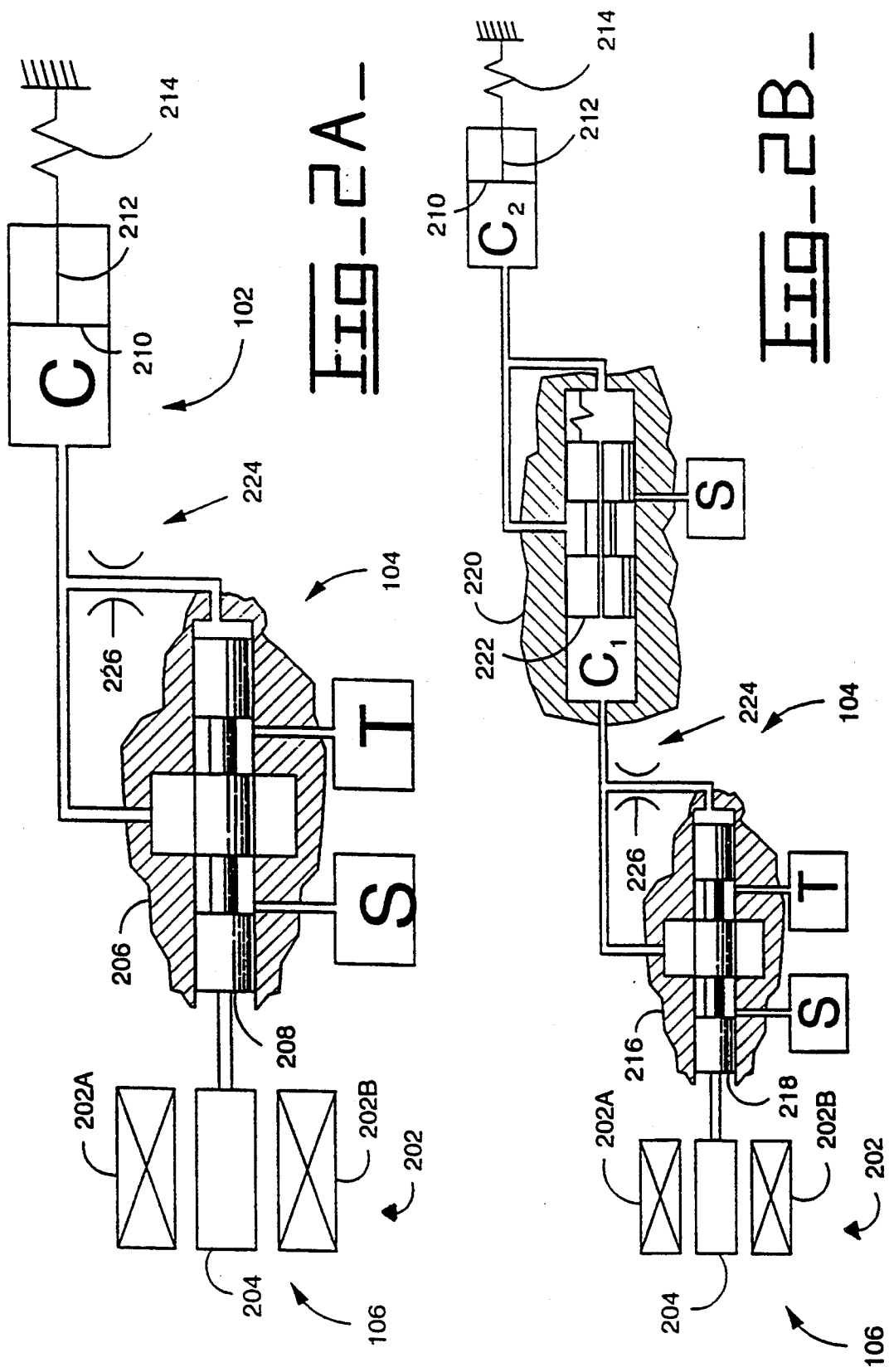

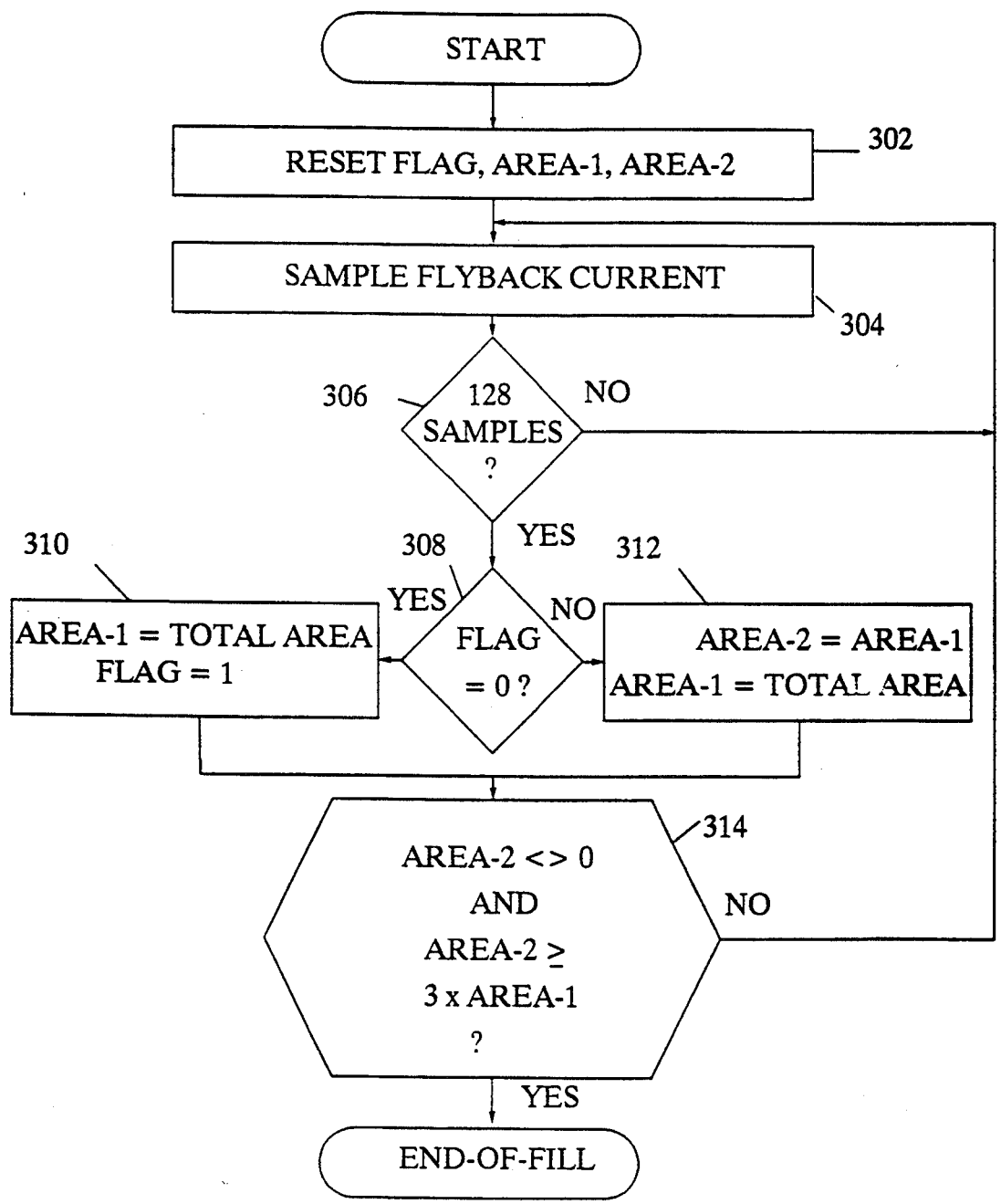
Fig_3_

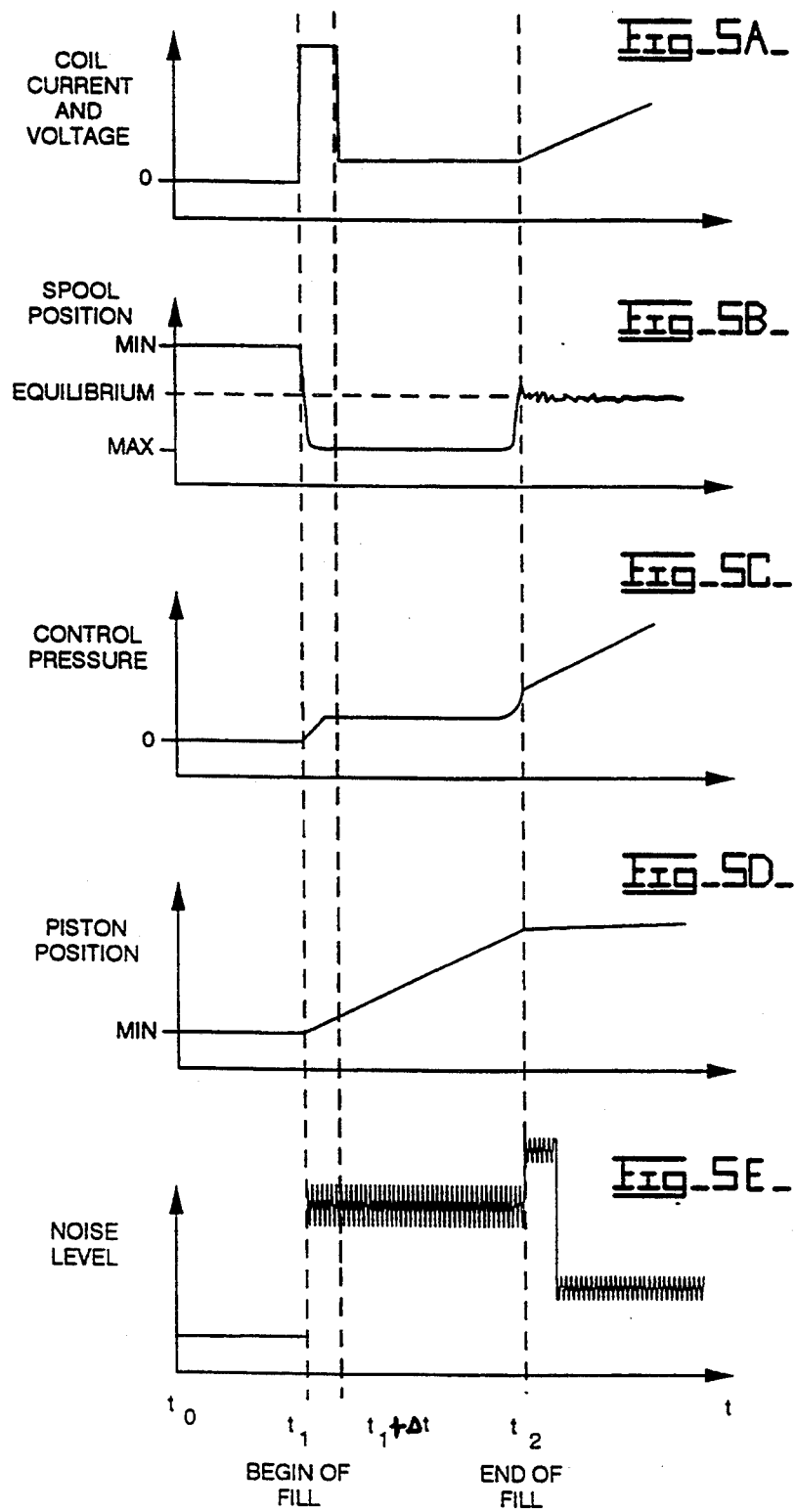

END OF FILL DETECTOR FOR A HYDRAULIC CLUTCH

TECHNICAL FIELD

This invention relates generally to an apparatus and method for detecting an end-of-fill condition for a hydraulic actuator and more particularly, to an apparatus and method for detecting a change in the level of noise present in a flyback current caused by the end-of-fill condition.

BACKGROUND ART

Electronic control systems are particularly well suited for applications in which operating conditions or parameters change. Electronic transmission controllers, for example, are becoming more prevalent because of their suitability for handling the complex tasks required for the shifting of a transmission between gear ratios.

Usually, electronic solenoids are used for the engagement/disengagement of the transmission's clutches. The engagement of a hydraulic clutch consists of two stages: the fill mode and the pressure modulation mode. In the fill mode, the clutch volume is filled with hydraulic fluid. In the pressure modulation mode, the pressure within the clutch volume is modulated (increased) to a pressure level to ensure proper and full engagement of the clutch. To actuate the clutch, the solenoid is therefore, first energized to begin filling the clutch.

After a predetermined time, the level of energization may be dropped, for example, by twenty-five percent, to avoid pressure spikes when end-of-fill is reached.

When the clutch is filled, the current applied to the solenoid is modulated (typically, in an increasing linear ramp function) to continue the flow of hydraulic fluid to the clutch and, thereby, increase the pressure to a level sufficient to properly engage the clutch.

Typically, a timing strategy has been used to determine when the clutch has reached the end of fill condition. In this situation, the solenoid's coil would be energized and the clutch would begin to fill with hydraulic fluid. After a predetermined time period, the transmission controller would begin to modulate current, in an effort to fully engage the clutch.

This procedure has several limitations. For example, operating conditions change the actual time required to fill the clutch. Since pump flow is a function of engine speed, pump flow will vary with engine speed. Other factors (for example, other hydraulic systems being supplied by the pump) may also affect pump flow. As the pump flow varies, the time required to fill the clutch will also vary. Other operating conditions which affect the clutch fill times are present gear ratio, desired gear ratio, transmission load, and inclination of the vehicle.

Variations in the engine and operating characteristics of the transmission components can be expected over the life of the vehicle due to wear. This will also affect the clutch fill time.

Furthermore, the variations in the system components, including the clutches, due to manufacturing tolerances will also affect clutch fill time.

If the proper fill time is not known or accurately estimated, the clutch will be in a overfill or underfill condition when the controller attempts to modulate clutch pressure to fully engage the clutch.

Operation of the transmission by modulating the clutch pressure in a underfill or overfill condition will cause a "jerky" shift action and increase the rate at which wear and tear occurs.

In an attempt, to predict fill times, it is known to add sensors to the transmission controller. For example, U.S. Pat. No. 4,707,789 issued to Robert C. Downs et al., on Nov. 17, 1987, uses a transmission input speed sensor to detect underfill/overfill condition. The time delay used to estimate clutch fill is adjusted based upon the transmission input speed. However, transient changes, that is, changes in the operating conditions that the controller has not adapted to, will affect the shift quality. Furthermore, a transient condition will have a negative effect on the fill time for the next shift without the transient condition.

In another attempt to accurately predict the end of fill condition, it is known to add additional valves to the controller. One such system is shown in the Komatsu technical guide, "K-ATO1VIICS Komatsu-Advanced Transmission with Optimum Modulation Control". A flow sensing valve is used to sense a pressure differential. The spool of the flow sensing valve closes a switch in response to the pressure differential, thereby, signalling the end of fill condition. In still another attempt, hydraulic pressure is used to predict the end of fill condition. U.S. Pat. No. 4,942,787 issued to Takashi Aoki et al, on Jul. 24, 1990 discloses the use of a pressure detection switch for that purpose. However, the cost added by the additional components in both these systems, plus, the added manufacturing cost due to the increased complexity, make these systems undesirable.

Still another attempt to detect the end-of-fill condition of a transmission clutch is disclosed in U.S. Pat. No. 5,045,599 issued to Tony L. Marcott on Oct. 8, 1991 ('599). The apparatus disclosed in '599 uses the detection of a voltage spike generated in the coil current as a result of end-of-fill. The voltage spike is generated by an electromotive force applied to the spool in a control valve at end-of-fill. However, it has been discovered that for some applications, it is desirable to detect end-of-fill earlier than at the point in time when the voltage spike is generated.

The present invention is directed at overcoming one or more of the problems as set forth above.

DISCLOSURE OF THE INVENTION

In one aspect of the present invention an apparatus for detecting an end-of-fill condition of an actuator having a varying control volume is provided. The end-of-fill condition corresponds to the varying control volume being pressurized to a predetermined end-of-fill pressure. The apparatus comprises a solenoid having a coil and an armature. The armature is movable relative to the coil in response to energization of the coil. A valve delivers a flow of fluid to the actuator. The fluid flow having a rate responsive to the movement of the armature. The apparatus controllably energizes the coil with a control current. The apparatus detects a flyback current in the coil, detects a change in the level of noise in said flyback current, and responsively produces an end-of-fill signal in response to the change being greater than a predetermined threshold.

In another aspect of the present invention, a method for detecting an end-of-fill condition of an actuator having a varying control volume, is provided. The end-of-fill condition corresponds to the varying control volume being pressurized to a predetermined end-of-fill pressure. The varying control volume is connected to a source of pressurized fluid by a control valve. The control valve is actuatable by a solenoid having a coil and an armature. The method includes the steps of energizing the coil with a first current, delivering a flow of fluid from the pressurized fluid to the actuator in response to the energization of the coil with the first current, and detecting a flyback current in the coil. The method further includes the steps of detecting a change in the level of noise in a flyback current, and responsively producing an end-of-fill signal.

BRIEF DESCRIPTION OF DRAWINGS

FIG. 1 is a block diagram of a clutch and a control system having an end of fill detector according to the present invention;

FIG. 2A is a diagrammatical view of a single stage solenoid operated clutch cylinder;

FIG. 2B is a diagrammatical view of a solenoid operated clutch cylinder having a dual stage spool valve design;

FIG. 3 is a flow diagram of a method according to an embodiment of the present invention;

FIG. 4 is a schematic of a portion of the control system and the end-of-fill detector;

FIG. 5A is an exemplary graph illustrating coil current and voltage during clutch actuation;

FIG. 5B is an exemplary graph illustrating spool position during clutch actuation;

FIG. 5C is an exemplary graph illustrating clutch control pressure during clutch actuation;

FIG. 5D is an exemplary graph illustrating clutch position during clutch actuation; and FIG. 5E is an exemplary graph illustrating flyback current noise level during clutch actuation.

BEST MODE FOR CARRYING OUT THE INVENTION

With reference to FIG. 1, the present invention 100, hereinafter referred to as an end-of-fill detector, is adapted to controllably detect an end-of-fill condition of an actuator 102. In the preferred embodiment, the actuator 102 is an electrically operated solenoid actuated hydraulic clutch. A control means 110 produces a signal to engage the clutch 102.

For example, in one embodiment, the control means 110 is a transmission controller adapted to controllably engage and disengage the clutches of a vehicle's transmission. The transmission controller 110 receives signals indicative of certain parameters of the vehicle (for example, engine speed, accelerator pedal position, and ground speed) and generates signals to engage/disengage the clutches in accordance with a set of shifting rules. Typically, such controllers include a microcontroller or microcomputer. Many variations of such transmission controllers are well known in the art and are therefore not discussed further.

In the preferred embodiment, the signal from the transmission controller 110, is a current applied to the coil of an electrical solenoid 106. A valve means 104 delivers hydraulic fluid from a source of pressurized fluid to the clutch 102 in response to the current applied to the coil of the electrical solenoid 106.

With reference to FIG. 2A, the solenoid 106 includes a coil 202, modeled as two boxes 202A,202B, and an armature 204. In the preferred embodiment, the valve means 104 includes a spool (control) valve 206. The spool valve 206 is connected between the clutch 102 and a source of pressurized fluid S, and includes a spool 208. The spool 208 is connected to the armature 204 of the solenoid 106. When no current is being applied to the solenoid 106, the spool valve 206 is said to be in a no-flow position. That is, there is no fluid flow between S and the clutch volume, C. When maximum fluid flow is allowed between S and C, the spool valve is said to be in a full flow position. A tank of hydraulic fluid T, is also provided to allow the clutch 102 to drain. The pressurized hydraulic fluid is created by a pump arrangement (not shown). Many such arrangements are known in the art, and are therefore not further discussed.

A clutch volume, C, is defined by the walls of the clutch 102 and a piston 210. The clutch 102 includes a number of clutch plates (not shown). When the clutch volume, C, is pressurized to its end-of-fill pressure, the clutch plates are pinned together and the clutch 102 is said to be engaged. For the purpose of illustration, the clutch plates are modeled by a rod 212 and a spring 214. The spring 214 acts to bias the piston 210 to the left, thereby acting to decrease the clutch volume and to disengage the clutch 102.

Feedback means 224 provides a restricted flow of fluid from the clutch volume, C back to the valve means 104. In the preferred embodiment, the feedback means 224 includes a restrictive orifice 226.

As hydraulic fluid is delivered to the clutch 102, the clutch or control volume increases to a maximum or near maximum level. During this fill condition, as a result of the various forces acting on the spool valve, the spool and armature are moved back and forth at a high frequency. This movement is known as "dithering" or "jittering". The dithering creates an electromotive force which generates high frequency noise in the coil current. It has been discovered however, that as the clutch volume nears the end-of-fill condition, the level of this noise first increase and then drops off. A sensing means 108 detects a change in the level of noise and produces an end-of-fill signal. The sensing means 108 may detect either an increase in the noise level or a decrease.

In the preferred embodiment, the sensing means 108 detects a flyback current in the coil, senses noise in the flyback current, detects a change in the level of noise in the flyback current, and responsively produces an end-of-fill signal in response to the change being greater than a predetermined threshold.

In one embodiment, the threshold level of noise is a percentage of the noise present during the fill condition. For example, end-of-fill condition is detected when the noise level falls off by 75%.

With reference to FIG. 4, the sensing means 108 includes a flyback diode 406 and a resistor 404 connected in series. The resistor 404 measures the flyback current. A buffer 408 reads the voltage across the resistor 404 as an indication of the noise present in the flyback current. The flyback current is delivered to the control means 110. The control means 110 samples the output of the buffer and processes the information in accordance with a method, described below, to determine when end-of-fill occurs.

In one embodiment, the control means 110 determines the amplitude spectrum of the noise and detects the occurrence of the end-of-fill condition when the amplitude of the noise has fallen below a predetermined percentage of the fill condition noise.

In another embodiment, the level of noise is determined as the area defined by the amplitude spectrum.

In the preferred embodiment, the amplitude spectrum is determined by using a fast wavelet transform. The fast wavelet transform is disclosed in an article by Mac A. Cody, published April 1992 in Dr. Dobb's Journal: *The Fast Wavelet Transform*, which is hereby incorporated by reference.

In still another embodiment, the level of noise is determined as the root mean square (RIMS) of the noise.

In another embodiment of the present invention, a method for detecting an end-of-fill condition of an actuator is provided. The method includes the steps energizing the coil with a first current, delivering a flow of fluid from the pressurized fluid to the actuator in response to the energization of the coil with the first current and detecting a flyback current in the coil and sensing noise in said flyback current. The method further includes the steps of detecting a change in the level of noise in the flyback current and responsively producing an end-of-fill signal in response to said change being greater than a predetermined threshold.

With reference to FIGS. 5A–5E, graphical representations of the coil current (and voltage), spool position, clutch control pressure, the flow of hydraulic fluid to the clutch 102 (Q), piston position, and noise level are shown for the purpose of illustrating the operation of the end-of-fill detector 100 during a typical fill operation.

At time, $t_0$, the clutch 102 is disengaged, coil current and voltage are zero (0), there is no flow of hydraulic fluid to the clutch, the spool is at its minimum position, and the piston is at its minimum position. Before $t_0$, the clutch 102 is said to be fully disengaged.

Prior to time $t_1$, the controller 110 signals the solenoid 106 to actuate the valve means 104 and to fill (engage) the clutch 102. In the preferred embodiment, the controller 110 includes a pulse width modulated (PWM) solenoid driver 402 for controlling the current supplied to the coil 202. PWM drivers are well known in the art and are therefore not further discussed.

At $t_1$, the PWM solenoid driver delivers a first current level to the coil 202, as shown in FIG. 5A. The current within the coil 202 creates an electromotive force (EMF) within the solenoid 202. The armature 204 is movable relative to the coil 202 and in response to the E1MF. To begin filling the clutch volume, the first current level from the PWM driver 402 acts to move the armature 204 and therefore, the spool 208, from the minimum or original position towards a maximum position, see FIG. 5B. In the maximum position, maximum flow between S and C is allowed (see FIG. 5C).

In the preferred embodiment, at time a $t_1+\Delta t$, the driver 402 drops the coil current to some predetermined hold value.

As shown in FIG. 5D, the flow of hydraulic fluid into the clutch volume acts against the piston 210 and the spring 214, moving the piston 210 (also to the right), and thereby, increasing the clutch volume. As the piston 202 moves to the right, the clutch plates begin to compress. At time $t_2$, the piston is near its maximum position, the clutch plates are nearly locked, the pressure within the clutch volume increases sharply due to the increased resistance from the clutch plates and the continued flow of hydraulic fluid from S. The increase in pressure acting through the feedback means 224, dampens the dithering of the spool, thereby decreasing the noise level in the flyback current.

For large clutches, a multistage design may be needed to gain the benefits of higher fluid flow. With reference to FIG. 2B, a dual stage spool valve design includes a first spool or pilot valve 216 and a second spool or control valve 220. The solenoid 204 is connected to the first spool 218 of the first spool valve 216. The first spool 218 is movable in response to energization of the coil 202 and allows fluid to flow from S to the first control volume, $C_1$. The first spool valve 216 controls the flow of fluid to a second control volume, $C_2$ (the clutch volume). The control valve 220 has a second spool 222. The second spool 222 allows fluid to flow from the first control volume, $C_1$ to the second control volume, $C_2$ through a conduit in the second spool 222. The second spool 222 is spring biased to close the path between the source, S and the clutch volume. The first spool valve 216 creates a pressure differential across the second spool valve 220. When the pressure differential becomes large enough to overcome the biasing force, the spool moves and fluid is allowed to pass directly from S to the clutch through the second spool valve 220.

There are many variations of such multistage designs with parameters suited to different applications. For example, different feedback schemes and spool designs will give the system different operating characteristics. Since the specific design of the valve means 104 is application specific and has no bearing on the present invention, no further discussion is given.

As mentioned above, the control means 110 includes is preferably microprocessor based. With reference to FIG. 3, the microprocessor based control means 110 is programmed to detect the end-of-fill condition of the clutch. In a first control block, a flag and two temporary variables, AREA-1 and AREA-2, are reset to zero (0).

In a second control block 304, the flyback current is sampled, as detected by the resistor 404, diode 406, and buffer 408. In a first decision block 306, if 123 samples have been collected, control proceeds to a second decision block 308. If 128 samples have not been collected then control returns to the second control block 404.

In the second decision block 308, if the flag is equal to zero control proceeds to a third control block 310. If the flag is not equal to zero, then control proceeds to a fourth control block 3 12. In the third control block 310, AREA-1 is set equal to the total area defined by the 128 samples of the noise level and the FLAG is set equal to 1. In the fourth control block 312, AREA-2 is set equal to the total area from the last 128 samples (AREA-1) and AREA-1 is set equal to the total area defined by the 128 samples of the noise level.

In a third decision block 314, if AREA-2<>0 and AREA-2≧3×AREA-1 then end-of-fill has been reached. If not, then control returns to the second control block 304.

Industrial Applicability

With reference to the drawings and in operation, the present invention is adapted to signal a transmission controller 110 at the occurrence of an end of fill condition of an electrical solenoid operated hydraulic clutch 102. The following description is only for the purposes of illustration and is not intended to limit the present invention as such. It will be recognizable, by those skilled in the art, that the present invention is suitable for a plurality of other applications.

The transmission controller 110 controls the shifting of a transmission on a vehicle (not shown) between a plurality of gear ratios. For example, the transmission may include three forward and three reverse gear ratios.

The transmission controller 110 operates a plurality of electrical solenoids. The solenoids are adapted to engage/disengage the transmission's hydraulic clutches, such that the transmission is shifted to the desired gear ratio.

The transmission controller 110 receives information related to the desired operation of the vehicle and to the vehicle's operating environment and energizes/de-energizes the solenoids. For example, the controller 110 may receive information related to a desired or maximum gear ratio, the position of the accelerator pedal (not shown), and/or the actual speed of the vehicle.

Based on the received information, the controller 110, operates the hydraulic clutches through actuation of the solenoids in accordance with a set of programmed shift rules. For example, in response to the received information, the controller 110 requires an upshift to the third forward gear ratio. To implement this requirement, one or more clutches need to be disengaged and one or more additional clutches engaged. The exact clutch(es) to be engaged/disengaged are dependent upon the structure of the transmission.

The controller 110, begins to fill the required clutches 102, as discussed above. When a clutch 102 reaches the end of fill condition, the respective sensing means 108 signals the controller 110 that the end of fill condition has been reached and the controller 110 can begin to modulate the coil current to engage the clutch 102.

I claim:

1. An apparatus for detecting an end-of-fill condition of an actuator having a varying control volume, said end-of-fill condition corresponding to said varying control volume being pressurized to a predetermined end-of-fill pressure, comprising:
   a solenoid having a coil and an armature, said armature being movable relative to said coil in response to energization of said coil;
   valve means for delivering a flow of fluid to said actuator, said fluid flow having a rate responsive to the movement of said armature;
   control means for controllably energizing said coil with a control current;
   sensing means for detecting a flyback current in said coil, sensing noise in said flyback current, detecting a change in the level of noise in said flyback current, and responsively producing an end-of-fill signal in response to said change being greater than a predetermined threshold.

2. An apparatus, as set forth in claim 1, wherein said threshold is determined as a percentage of the level of noise.

3. An apparatus, as set forth in claim 1, wherein said sensing means includes a flyback diode and a resistor connected in series.

4. An apparatus, as set forth in claim 3, wherein said noise is detected as a voltage across said resistor.

5. An apparatus, as set forth in claim 1, wherein said sensing means includes means for determining amplitude spectrum of said noise, wherein said level of said noise is determined as an area defined by said amplitude spectrum.

6. An apparatus, as set forth in claim 5, wherein said amplitude spectrum is determined by using a fast wavelet transform.

7. An apparatus, as set forth in claim 1, wherein said level of said noise is determined as a root mean square of said noise.

8. An apparatus, as set forth in claim 1, wherein said actuator is a hydraulically actuated clutch piston.

9. An apparatus, as set forth in claim 1, wherein said valve means includes a control valve having a spool and being connected between a source of pressurized fluid and said actuator, said spool being connected to said armature.

10. An apparatus, as set forth in claim 1, wherein said valve means includes a pilot valve connected to a source of pressurized fluid and a control valve connected between said pilot valve and said fluid actuator.

11. An apparatus, as set forth in claim 1, including feedback means for providing a restricted flow of fluid from said varying control volume back to said valve means.

12. An apparatus, as set forth in claim 7, wherein said feedback means includes means for imposing movement upon said armature in response to said varying control volume reaching said end-of-fill condition.

13. An apparatus, as set forth in claim 1, wherein said control means includes a microprocessor.

14. An apparatus, as set forth in claim 13, wherein said control means includes a pulse width modulated driver.

15. A method for detecting an end-of-fill condition of an actuator having a varying control volume, said end-of-fill condition corresponding to said varying control volume being pressurized to a predetermined end-of-fill pressure, said varying control volume being connected to a source of pressurized fluid by a control valve, said control valve being actuatable by a solenoid, said solenoid having a coil and an armature, comprising the steps of:
   energizing said coil with a first current;
   delivering a flow of fluid from said pressurized fluid to said actuator in response to the energization of said coil with said first current;
   detecting a flyback current in said coil, sensing noise in said flyback current;
   detecting a change in the level of noise in said flyback current;
   and responsively producing an end-of-fill signal in response to said change being greater than a predetermined threshold.

16. A method for engaging a hydraulic clutch having a varying control volume in response to an engage signal, said varying control volume being connected to a source of pressurized fluid by a control valve, said control valve being actuatable by a solenoid, said solenoid having a coil and an armature, comprising the steps of:
   energizing said coil with a first current;
   delivering a flow of fluid from said pressurized fluid to said clutch in response to the energization of said coil with said first current;
   detecting a flyback current in said coil, sensing noise in said flyback current;
   detecting a change in the level of noise in said flyback current;
   responsively producing an end-of-fill signal in response to said change being greater than a predetermined threshold; and
   receiving said end-of-fill signal and responsively energizing said coil with a second current.

* * * * *